US006770298B1

(12) United States Patent
Debregeas et al.

(10) Patent No.: US 6,770,298 B1
(45) Date of Patent: Aug. 3, 2004

(54) DEVICE FOR COATING GRANULES TO BE ADMINISTERED ORALLY

(75) Inventors: Patrice Debregeas, Paris (FR); Gérard Leduc, Malesherbes (FR); Pascal Oury, Versailles (FR); Patrice Romain, Rouen (FR)

(73) Assignee: Laboratoires des Produits Ethiques Ethypharm, Houdan (FR)

(*) Notice: Subject to any disclaimer, the term of this patent is extended or adjusted under 35 U.S.C. 154(b) by 0 days.

(21) Appl. No.: 09/582,871

(22) PCT Filed: Jan. 5, 1999

(86) PCT No.: PCT/FR99/00003

§ 371 (c)(1),
(2), (4) Date: Aug. 9, 2000

(87) PCT Pub. No.: WO99/34919

PCT Pub. Date: Jul. 15, 1999

(30) Foreign Application Priority Data

Jan. 6, 1998 (FR) ........................................... 98 00048

(51) Int. Cl.[7] ............................ A61K 9/14; A61K 9/16; B05B 17/00; B05C 3/00

(52) U.S. Cl. ....................... 424/489; 424/490; 424/491; 427/2.1; 427/2.11; 427/2.14; 118/303; 118/417; 118/418

(58) Field of Search ................................ 424/489, 490, 424/491; 427/2.1, 2.11, 2.14; 118/303, 417, 418

(56) References Cited

U.S. PATENT DOCUMENTS 5,033,405 A * 7/1991 Yamada et al. ............. 118/418
5,376,175 A * 12/1994 Long, Jr. et al. ........... 118/303
5,939,097 A * 8/1999 Fusejima et al. ........... 424/451

FOREIGN PATENT DOCUMENTS

EP 0 648 529 4/1995
EP 0 648 529 A1 * 4/1995
FR 2 130 602 11/1972

* cited by examiner

*Primary Examiner*—Thurman K. Page
*Assistant Examiner*—S. Tran
(74) *Attorney, Agent, or Firm*—Foley & Lardner LLP

(57) ABSTRACT

The invention concerns a device for producing granules, in particular pharmaceutical granules, comprising a drum (4) with peripheral apertures (25) and a member (30) feeding the drum with coating or fixing substance. The drum (4) comprises mutually parallel sections (22) defining between them the apertures (25).

20 Claims, 2 Drawing Sheets

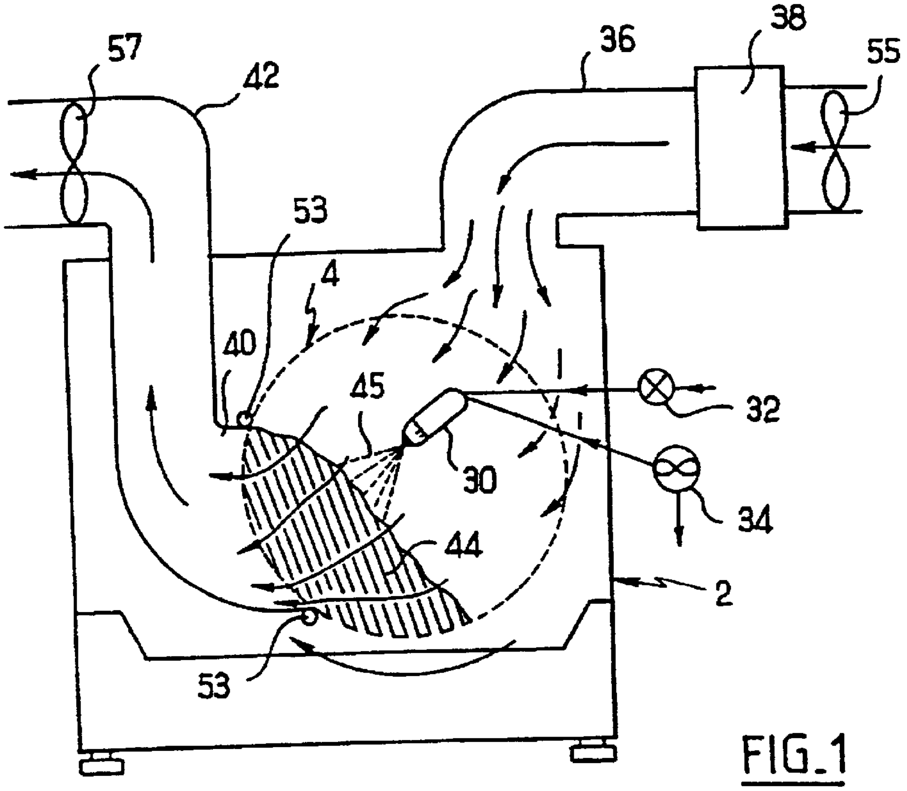
FIG_1
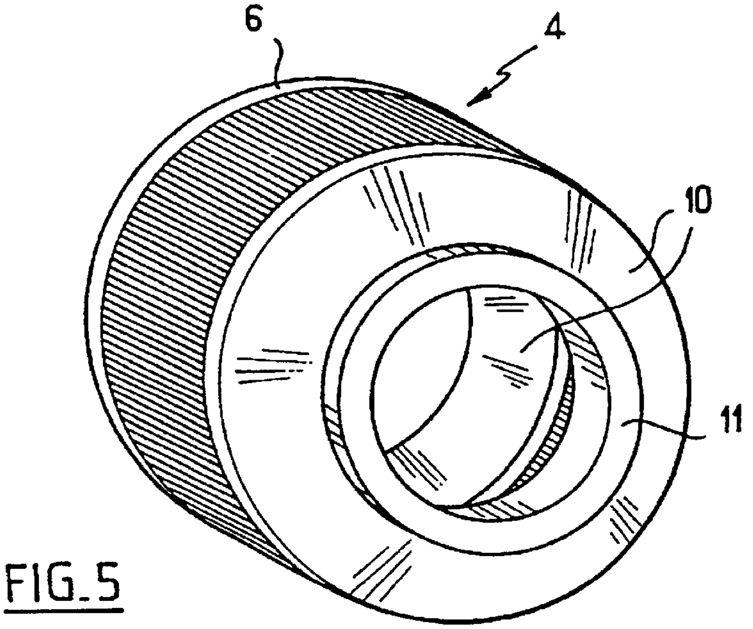
FIG_5

DEVICE FOR COATING GRANULES TO BE ADMINISTERED ORALLY

The invention relates to the production of solid products to be administered orally, in particular pharmaceutical products such as microgranules.

Medicaments to be swallowed, formed by a gelatine capsule enclosing microgranules with a maximum dimension of, for example, between 0.4 and 1.4 mm, are known. The aim is, by means of these microgranules, to obtain steady and prolonged release over time of a substance such as an active ingredient into the organism in order to reduce the number of doses taken by the patient. The production of the microgranules involves a stage in which the active ingredient in solution is fixed around inert grains, e.g. starch. This stage should make it possible to obtain on each grain one or more uniform homogeneous coating layers of predetermined thickness formed by a solution containing the active ingredient.

An existing system makes it possible to coat tablets of dimensions greater than 5 mm. These tablets are placed in a drum having perforations of a diameter less than 5 mm in order to avoid escape of the particles while at the same time allowing air to pass through the mass of tablets to be coated. With the drum rotating, the coating liquid is atomized onto the tablets. An air circuit allows elimination of the solvents and thus continuous formation of the coating layer.

As regards the microgranules, since these generally have a diameter of between 0.4 and 1.4 mm, which is thus markedly less than that of the tablets, it is impossible to place them in this drum, because the result would be that the microgranules would immediately escape via the perforations.

To mitigate this problem, one solution, which would be very difficult to implement and costly, would be to manufacture a drum with perforations less than 0.4 mm. Moreover, the small diameter of the apertures would entail a significant pressure drop in the air circuit.

Another solution, which is less costly, is to line the inside of the drum with a metallic cloth or screen with a mesh which prevents the passage of the microgranules. In this case, there are numerous constraints:

- the fineness of the mesh makes the cloth very fragile and prone to tear, which entails the escape of the microgranules and hence the contamination of the air circuit and of the remainder of the installation;
- the mesh is very rapidly obstructed by deposition of coating residues, necessitating frequent cleaning. The risk of clogging thus makes it necessary to reduce considerably the atomization rate of the coating solution; and
- cleaning is made very difficult by the fact that the screen has to be removed. Moreover, even with thorough cleaning, there are numerous risks of contamination such that traces of a first active ingredient will be detected on the subsequent product.

One object of the invention is to provide a device suitable for the production of granules, in particular mini- or microgranules, which is easy to manufacture, entails a small pressure drop in the air circuit, reduces the risks that the product will escape into the installation, reduces the risks of cross-contamination and allows fixing or coating with a high output of coating or fixing substance.

With a view to achieving this object, the invention provides a device for the production of granules, in particular pharmaceutical granules, the device having a drum with peripheral apertures and a member for feeding the drum with coating or fixing substance, in which the drum has mutually parallel sections which define between them the apertures.

The width of the apertures thus depends on the spacing chosen for the sections. This spacing can be very small so as to obtain very narrow apertures suitable for the production of microgranules with a diameter between 0.4 and 1.5 mm, for example. This drum is easy to manufacture, including very narrow apertures. Moreover, the percentage of gaps in the wall of the drum is high, such that the pressure drop as any circulating air crosses the drum is reduced. The sections make the wall of the drum very strong. Any risk that the granules will escape into the installation is thus avoided. The sections are very easy to clean, in particular from the outside of the drum, thus reducing the risks of cross-contamination when fixing two different products in succession. Moreover, since the sections cause little clogging, fixing or coating can be carried out at a high rate of flow of coating or fixing fluid. Hence, when the products to be fixed or coated are sensitive to heat or humidity, the risks of degradation of the products are avoided. The device is particularly suitable for fixing or coating microgranules for medical applications comprising an active ingredient which should be released steadily and over a prolonged period into the organism.

It is advantageous if the sections have edges arranged opposite one another.

The edges thus make it possible to define the dimensions of the apertures very accurately.

It is advantageous if the edges delimit a flat face of each section, the said face facing the inside of the drum.

The flat faces of the sections thus define a flat internal face of the drum, which may be cylindrical, allowing the products fixed or coated to be given a very smooth surface.

It is advantageous if each section has a width that decreases from the inside towards the outside of the drum.

The drum is thus simple to clean, particularly from the outside of the drum, the lateral faces of the sections guiding a cleaning fluid towards the apertures between the sections for the purpose of unclogging them.

It is advantageous if each section has a triangular profile.

It is advantageous if the sections are rectilinear and parallel to an axis of rotation of the drum.

It is advantageous if the sections are curved.

It is advantageous if the drum has sectors which carry the sections and can be removed independently of one another.

This makes the drum easier to clean.

It is advantageous if the substance feed member is arranged in the drum.

It is advantageous if the substance feed member comprises an atomizer.

It is advantageous if the substance feed member is connected to a source of liquid.

It is advantageous if the substance feed member is connected to a source of compressed air.

It is advantageous if the device has means for the continuous supply of a gas to the interior of the drum and for forcing the gas to pass through the apertures from the inside towards the outside of the drum.

It is advantageous if the device has means for heating the gas upstream of the drum.

It is advantageous if the device is set up such that the gas passes through the apertures from the outside towards the inside of the drum.

The invention also provides a process for producing granules, in particular pharmaceutical granules, in which use is made of a device according to the invention.

Moreover, the invention provides granules, in particular pharmaceutical granules, which have been produced by means of a process according to the invention.

The invention also provides packaging such as a sachet or gelatine capsule comprising granules according to the invention.

Other characteristics and advantages of the invention will become apparent from the following description of a preferred embodiment given by way of nonlimitative example. In the attached drawings:

FIG. 1 is a schematic view showing the circulation of the fluids in a device according to a preferred embodiment of the invention;

FIG. 5 is a view similar to FIG. 2 showing a variant embodiment of the drum.

Figure 2:
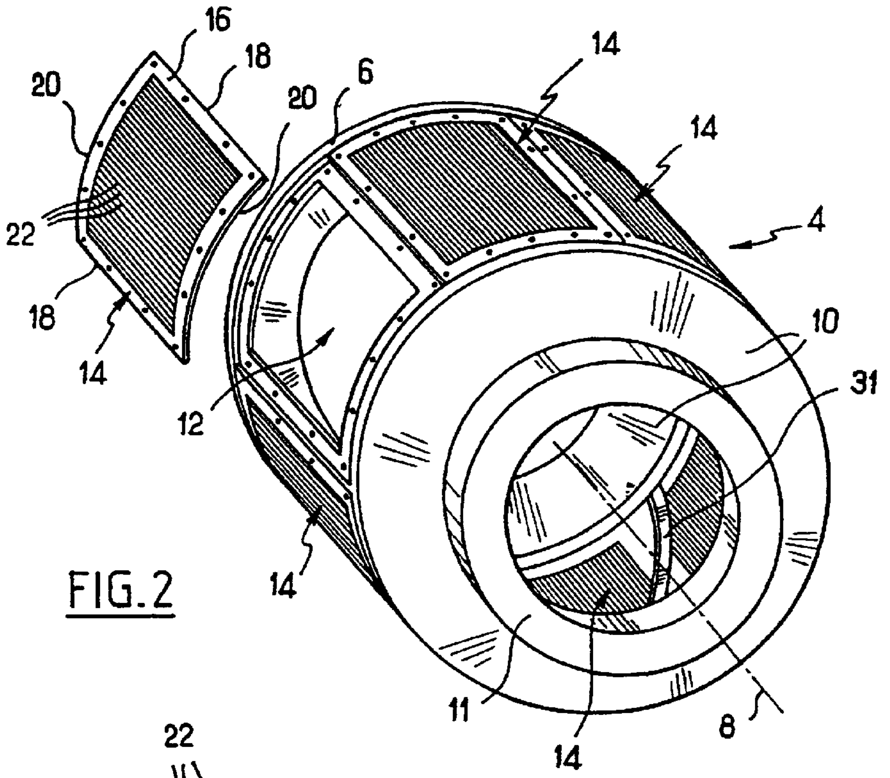
FIG. 2 is a perspective view of the drum of the device in FIG. 1 with a wall sector removed.
Figure 3:
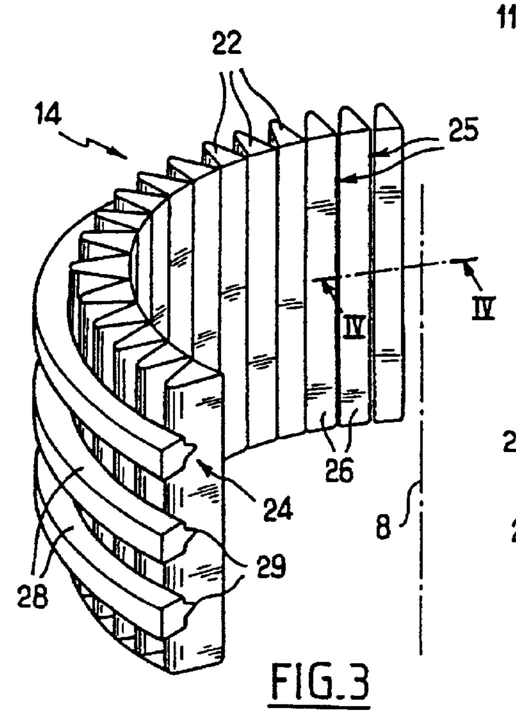
FIG. 3 is a perspective view of part of the wall of the drum in FIG. 2.

Referring to FIG. 1, in a preferred embodiment the fixing or coating device according to the invention comprises an enclosure 2 containing a drum or turbine 4.

The drum 4 has a cylindrical peripheral wall 6 with an axis 8 and two frustoconical end walls 10 extending at two respective end edges of the cylindrical wall 6 and tapering away from these edges. The drum 4 has two cylindrical bearings 11 fixed to the narrower edges of the end walls 10. One of the bearings 11 is hollow and the other is solid. The cylindrical wall 6 has apertures 12 in the form of sectors of a cylinder. The drum 4 furthermore comprises wall elements 14 having the form of a sector of a cylinder complementary to that of the apertures 12. Each element 14 comprises a frame 16 having two mutually parallel rectilinear edges 18 and two circular edges 20 and capable of being fixed in a removable manner on the wall 6 to close the associated aperture 11.

Figure 4:
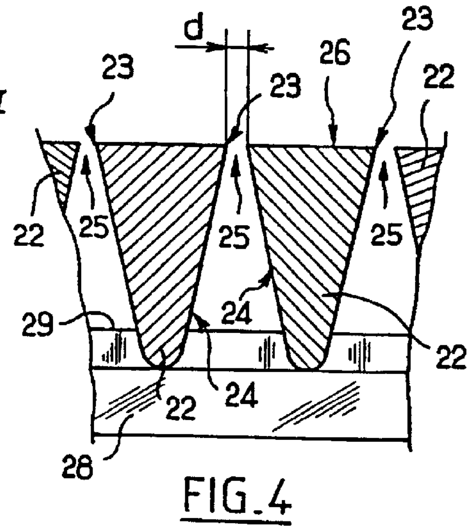
FIG. 4 is a view in cross section in the plane IV—IV of the wall in FIG. 3.

The wall element 14 has metallic sections 22, each identical to the other. Each section 22 is rectilinear and here has the general profile of an isosceles triangle. That angle of the triangle which is associated with the two equal sides is rounded, while the two other angles define sharp edges 23 of the section. The section thus has two mutually identical flat lateral faces 24 contiguous to the rounded angle and one flat front face 26 opposite this angle, the face 26 being delimited by the two sharp edges 23, between these two edges. Each section 22 has a width which decreases from the inside towards the outside of the drum 4. The sections 22 are spaced apart, face one another and extend parallel to one another and to the rectilinear edges 18 of the frame. The flat front faces 26 are substantially coplanar to one another. They are arranged in such a way as to define, perpendicularly to the sections 22, a discontinuous cylindrical internal face with a curvature identical to that of the curved edges 20 of the frame 16. The rounded edges of the sections 22 are all turned towards the outside on the side opposite the centre of curvature. The sharp edges 23 of the adjacent sections 22 extend parallel to one another, facing one another and at a distance from one another in such a way that they define between them apertures 25 in the form of rectilinear slits parallel to the axis 8. The spacing between the edges 23 is indicated by d in FIG. 4. The ends of the sections 22 are fixed to the curved edges 20 of the frame 16. The wall element 14 can advantageously have section supports 28 of flat curved form extending at a distance from one another in planes perpendicular to the axis of the cylindrical face defined by the front faces 26. The ends of the supports 28 are fixed to the rectilinear edges 18 of the frame. They are fixed to the sections 22 on the outside, opposite the front faces 26, by means of a part 29 with a pointed profile of the supports 28. These supports prevent the deformation of the rectilinear sections 22 and keep the distance d constant along the entire length of the sections.

The removable wall elements 14 can be cleaned easily from the outside. The opposing lateral faces 24 guide a cleaning fluid towards the apertures 25 in order to unclog them.

In the device 2, the drum 4 can rotate about its axis 8 and is driven in rotation about this axis by suitable means. The enclosure 2 has a port facing one of the bearings 11 to allow the introduction of grains 44 into the drum 4 via this bearing.

The device has an atomizer 30 capable of being simultaneously in fluid communication with a source of compressed air 32 and a liquid pump 34. This liquid is a coating solution and comprises, for example, an excipient solvent and an active ingredient dissolved in the solvent. The atomizer 30 extends in the drum 2 opposite the cylindrical internal face, the feed conduits of the atomizer 30 passing through the hollow bearing 11. The drum 4 has helical blades 31 fixed to the internal wall of the drum to accentuate the rotation of the grains 44 in the drum.

The device has an air feed conduit 36 opening into the enclosure 2 and means 38 extending in the conduit 36 upstream of the enclosure 2 for lowering or increasing the temperature of the air fed into the enclosure and moreover for regulating the humidity of this air. The device has an air outlet opening 40 contiguous to the cylindrical wall of the drum 4 and communicating with an air exhaust conduit 42 extending outside the enclosure. The opening 40 is arranged opposite a lower lateral part of the drum 4 where the grains 44 accumulate during the rotation of the drum. The atomizer 30 is aligned in such a way as to discharge the coating or fixing fluid 45 in the direction of this same part of the drum. The opening 40 has seals 53 which ensure leaktightness between the opening and the drum. In the feed conduit 36, the device has an upstream fan 55 extending upstream of the drum for the purpose of sending the air into the latter and, in the exhaust conduit 42, has a downstream fan 57, downstream of the drum, for the purpose of creating a vacuum in the drum. These two fans make it possible to regulate the speed of the air and the vacuum in the drum.

To implement the process according to the invention, a specific quantity of grains 44 to be fixed or coated or of microgranules already partially fixed or coated is introduced into the drum 4 via the port. The distance d is chosen to be less than a minimum diameter of these grains in order to prevent them from escaping via the cylindrical wall. The drum 4 is then set in rotation. The air circuit 36, 42 is put into operation, followed by the atomizer 30 for feeding the drum with a coating solution containing, for example, an active ingredient. To this end, the air supplied via the conduit 36 passes radially through the apertures 25 between the sections 22 in order to pass from the outside towards the inside of the drum 4. The air then passes through a fraction of the mass of grains 44 in rotation, then entrains the solvent radially through the apertures 25, this time from the inside towards the outside of the drum, and through the opening 40 towards the exhaust conduit 42. The active ingredient accumulates progressively on the grains 44 while the solvent is entrained and discharged into the conduit 42 by the air.

In the variant shown in FIG. 5, the drum 4 does not have a removable wall element: the sections 22 and, if appropriate, their supports 28, form the cylindrical wall themselves.

The device according to the invention can be used for fixing or coating products to be taken orally such as tablets or microgranules to be divided up into doses and enclosed in gelatine capsules or sachets. These products can be used for medical, therapeutic or cosmetic applications or be used as dietary supplements.

Of course, numerous modifications can be made to the invention without departing from the scope of the latter. The sections which define the apertures 25 between them could be curved and inclined relative to the axis 8 of the drum, being, for example, included in planes perpendicular to this axis.

The sections can have a profile of a different form, e.g. trapezoidal or in the form of a half disc.

What is claimed is:

1. A device for producing granules comprising a drum with peripheral apertures, a member for feeding said drum with coating or fixing substance, and a member for supplying gas, wherein said peripheral apertures are defined by the space between mutually parallel sections contained in said drum and, wherein a gas passes through said peripheral apertures between the inside and the outside of said drum.

2. Device according to claim 1, wherein the parallel sections have edges arranged opposite one another.

3. Device according to claim 2, wherein the edges delimit a flat face of each of the parallel sections, said face facing the inside of the drum.

4. Device according to any of claims 1 to 3, wherein each of the parallel sections has a width which decreases from the inside towards the outside of the drum.

5. Device according to any of claims 1 to 3, wherein each of the parallel sections has a triangular profile.

6. Device according to any of claims 1 to 3, wherein the parallel sections are rectilinear and parallel to an axis of rotation of the drum.

7. Device according to any of claims 1 to 3, wherein the parallel sections are curved.

8. Device according to any of claims 1 to 3, wherein the drum has sectors which carry the parallel sections and can be removed independently from one another.

9. Device according to any of claims 1 to 3, wherein the substance feed member is arranged in the drum.

10. Device according to any of claims 1 to 3, wherein the substance feed member comprises an atomizer.

11. Device according to any of claims 1 to 3, wherein the substance feed member is connected to a source of liquid.

12. Device according to any of claims 1 to 3, wherein the substance feed member is connected to a source of compressed air.

13. Device according to any of clams 1 to 3, further comprising means for continuous supply of a gas to the interior of the drum and for forcing the gas to pass through the apertures from the inside towards the outside of the drum.

14. Device according to claim 13, further comprising means for modifying the temperature of the gas upstream of the drum.

15. Device according to claim 13, wherein the gas passes through the apertures from the outside towards the inside of the drum.

16. Process for producing granules, where a device according to one of claims 1 to 3.

17. Device according to claim 1, wherein granules are pharmaceutical granules.

18. Process according to claim 16, wherein granules are pharmaceutical granules.

19. The device according to claim 1, wherein said mutually parallel sections form a surface of said drum supporting the granules.

20. The device according to claim 1, wherein said mutually parallel sections are arranged to be in contact with the granules.

* * * * *